L. A. BOCKSTAHLER.
GREASE CUP.
APPLICATION FILED AUG. 28, 1916.
1,208,732. Patented Dec. 19, 1916.
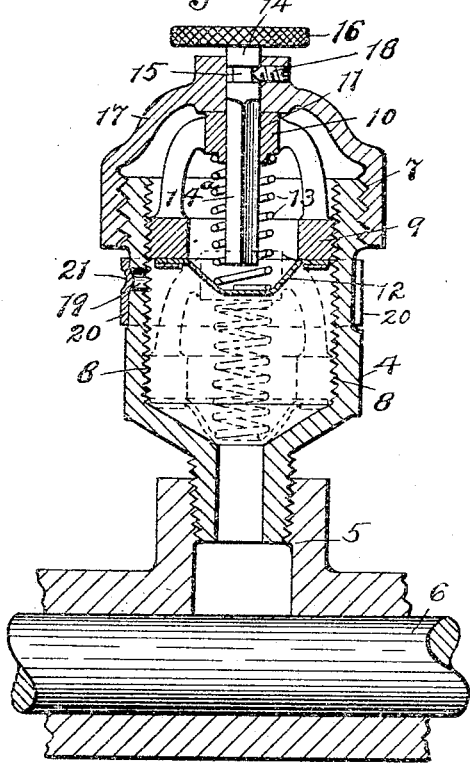
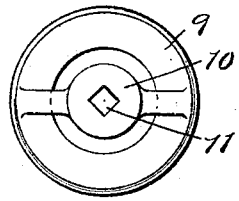
Witness
S. W. Brainard.
Inventor
Louis A. Bockstahler.
By John A. Bommhardt
Attorney

UNITED STATES PATENT OFFICE.

LOUIS A. BOCKSTAHLER, OF EAST CLEVELAND, OHIO.

GREASE-CUP.

1,208,732.      Specification of Letters Patent.      Patented Dec. 19, 1916.

Application filed August 28, 1916. Serial No. 117,264.

*To all whom it may concern:*

Be it known that I, LOUIS A. BOCKSTAHLER, citizen of the United States, residing at East Cleveland, in the county of Cuyahoga and State of Ohio, have invented certain new and useful Improvements in Grease-Cups, of which the following is a specification.

This invention relates to grease cups for lubricating purposes, and especially to grease cups of that type having a follower to eject the grease.

One of the main ideas of the invention is the provision of a flexible spring-pressed face of the follower, whereby the spring will continue to exert pressure after the follower is advanced by hand or otherwise to expel grease from the cup.

The invention is illustrated in the accompanying drawings, in which—

Figure 1 is a longitudinal section of the device shown applied to a bearing. Fig. 2 is a top view of the follower.

Referring specifically to the drawings, 4 indicates the body of a grease cup and 5 a bearing on which the cup is mounted, said bearing containing a shaft 6. The body of the cup is threaded on the outside as indicated at 7 to receive the cap 17, and on the inside as indicated at 8 to receive the follower.

The follower comprises a threaded ring 9 which screws into the cup, and this ring has a yoke 10 on the upper or rear side thereof, with a squared hole 11 therein. Secured at its edges to the inner face of the ring 9, and extending across the same, is a loose flexible diaphragm 12 behind which is a spring 13 in compression between the same and the yoke, the spring extending through the opening in the ring. A stem 14 extends through a central hole in the cap, and it has a squared part 14ª which fits slidably in the squared hole 11 in the yoke. A screw 18 is tapped through the cap and projects into a groove 15 in the stem, to hold the latter in position; and the stem has a head 16 by which it may turned.

A filling hole 19 is provided in the body of the cap, and is closed by a ring clip 20 which has a boss 21 engaging in the hole to keep the clip in position.

In operation, when the stem is turned the follower is screwed in or out in the cup, traveling along the squared part of the stem, and when the follower is so advanced the grease is forced out to the bearing. When the follower is advanced with sufficient pressure, the spring 13 will be compressed, and the diaphragm 12 will collapse. However, as the grease is used by the bearing, the spring will tend to advance or expand the diaphragm and so continue to supply additional grease to the bearing as it is used, said supply continuing until the diaphragm advances to its full extent, after which the follower must be again turned up as usual. It will be seen that the spring-pressed diaphragm provides a continuing supply of grease for a certain time after each hand operation. The manner of filling the cup or removing the follower is obvious.

What I claim as new is:

1. The combination of a grease cup, and a follower therein comprising a ring, a flexible diaphragm fixed to the ring and extending across the opening therein, and a spring pressing against the rear side of the diaphragm and tending to extend the same beyond the face of the follower.

2. The combination of a grease cup having a cap thereon, a follower movable in the cup and comprising a ring, a yoke connected thereto, a flexible diaphragm across the inner face of the ring, a spring between said diaphragm and yoke, and an operating rod extending through the cap and engaged with the yoke.

In testimony whereof I do affix my signature in presence of two witnesses.

LOUIS A. BOCKSTAHLER.

Witnesses:
    JOHN A. BOMMHARDT,
    S. W. BRAINARD.

Copies of this patent may be obtained for five cents each, by addressing the "Commissioner of Patents, Washington, D. C."